(12) United States Patent
Nakayama

(10) Patent No.: US 8,363,719 B2
(45) Date of Patent: Jan. 29, 2013

(54) ENCODING APPARATUS, METHOD OF CONTROLLING THEREOF, AND COMPUTER PROGRAM

(75) Inventor: Fumitaka Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1132 days.

(21) Appl. No.: 12/256,971

(22) Filed: Oct. 23, 2008

(65) Prior Publication Data

US 2009/0110063 A1    Apr. 30, 2009

(30) Foreign Application Priority Data

Oct. 29, 2007  (JP) .................................. 2007-280940
Feb. 22, 2008  (JP) .................................. 2008-040983
Oct. 15, 2008  (JP) .................................. 2008-266831

(51) Int. Cl.
*H04N 7/12*    (2006.01)
*H04B 1/66*    (2006.01)

(52) U.S. Cl. .................................. 375/240.03; 375/240

(58) Field of Classification Search ............. 375/240.03, 375/240

See application file for complete search history.

(56) References Cited

U.S. PATENT DOCUMENTS

| 2002/0113899 | A1* | 8/2002 | Swan | 348/607 |
| 2004/0071363 | A1* | 4/2004 | Kouri et al. | 382/276 |
| 2004/0101051 | A1* | 5/2004 | Ishii | 375/240.13 |
| 2007/0036213 | A1* | 2/2007 | Matsumura et al. | 375/240.03 |
| 2008/0101465 | A1* | 5/2008 | Chono et al. | 375/240.03 |
| 2008/0225944 | A1* | 9/2008 | Pore et al. | 375/240.03 |

FOREIGN PATENT DOCUMENTS

| JP | 11-196417 | 7/1999 |
| JP | 2003-061090 A | 2/2003 |
| JP | 2005-080151 A | 3/2005 |

OTHER PUBLICATIONS

Nov. 15, 2011 Japanese Office Action, which is enclosed without an English Translation, that issued in Japanese Patent Application No. 2008-040983.

\* cited by examiner

*Primary Examiner* — Techane Gergiso
(74) *Attorney, Agent, or Firm* — Cowan, Liebowitz & Latman, P.C.

(57) ABSTRACT

An encoding apparatus comprises, a detection unit configured to determine a characteristic of the image of each of a plurality of blocks and to detect whether visual degradation in each block is noticeable, a determination unit configured to determine a quantization parameter of each block based on a detection result, a transformation unit configured to perform orthogonal transformation of the block and quantization using the quantization parameter, an encoding unit configured to perform variable-length encoding of a transformation result, an inverse transformation unit configured to inversely transform the transformation result to generate a locally decoded image, and a calculation unit configured to calculate a reference value to change a criterion to determine the characteristic of the image, wherein the detection unit detects a block having noticeable visual degradation by changing the criterion in accordance with the reference value.

21 Claims, 11 Drawing Sheets

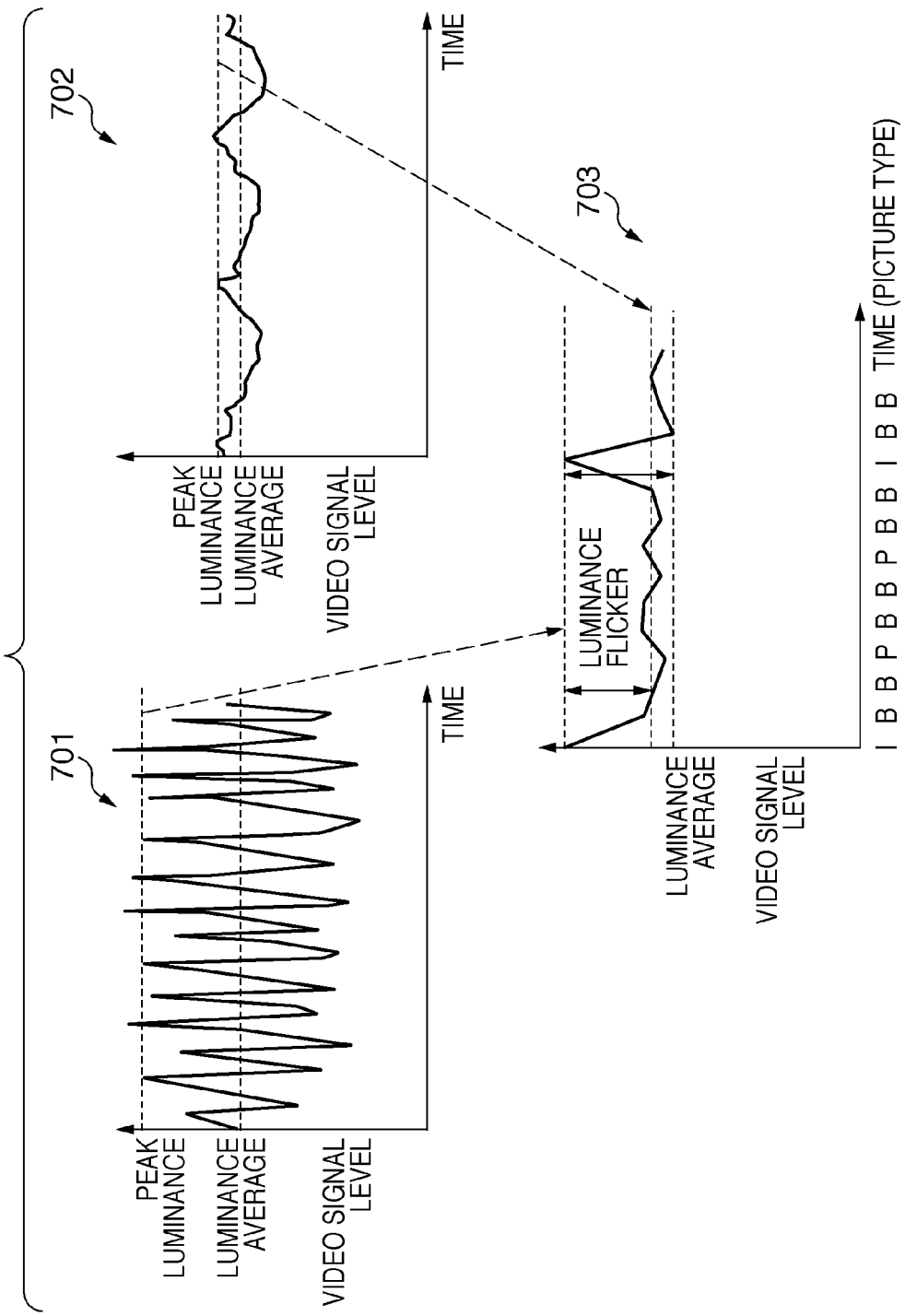

ENCODING APPARATUS, METHOD OF CONTROLLING THEREOF, AND COMPUTER PROGRAM

BACKGROUND OF THE INVENTION

1. Field of the Invention

The present invention relates to an encoding apparatus, a method of controlling thereof, and a computer program.

2. Description of the Related Art

Along the recent expansion of multimedia, various moving image compression encoding methods have been proposed. Typical examples are MPEG-1, 2, and 4, and H.264. In the compression encoding process, an original image (image) contained in a moving image is divided into predetermined regions called blocks, and motion compensation/prediction and DCT transformation are executed for each of the divided blocks. For motion compensation/prediction, a reference image is obtained by locally decoding already encoded image data. For this reason, a decoding process is necessary even in encoding.

When an image is compressed and encoded conforming to MPEG, the amount of code often largely changes depending on the spatial frequency characteristic that is the chracteristic of an image itself, a scene, and a quantization scale value. An important technique that allows obtaining a decoded image with high image quality upon implementing an encoding apparatus having such encoding characteristics is code amount control.

As one of code amount control algorithms, TM5 (Test Model 5) is generally used. The TM5 code amount control algorithm includes three steps to be described below. The amount of code is controlled in the following three steps to ensure a predetermined bit rate in every GOP (Group Of Picture).

(STEP 1)

The target amount of code of a picture to be encoded next is determined. Rgop that is the usable amount of code in the current GOP is calculated by $$R\text{gop}=(ni+np+nb)*(\text{bits\_rate}/\text{picture\_rate}) \quad (1)$$

where ni, np, and nb are the numbers of remaining I-, P-, and B-pictures in the current GOP, bits_rate is the target bit rate, and picture_rate is the picture rate.

Complexities Xi, Xp, and Xb of the I-, P-, and B-pictures are obtained based on the encoding results by $$Xi=Ri*Qi$$

$$Xp=Rp*Qp$$

$$Xb=Rb*Qb \quad (2)$$

where Ri, Rp, and Rb are amounts of code obtained by encoding the I-, P-, and B-pictures, Qi, Qp, and Qb are the average values of the Q-scale in all macroblocks in the I-, P-, and B-pictures. Based on equations (1) and (2), target amounts Ti, Tp, and Tb of code of the I-, P-, and B-pictures are obtained by $$Ti=\max\{(R\text{gop}/(1+((Np*Xp)/(Xi*Kp))+((Nb*Xb)/(Xi*Kb)))), (\text{bit\_rate}/(8*\text{picture\_rate}))\}$$

$$Tp=\max\{(R\text{gop}/(Np+(Nb*Kp*Xb)/(Kb*Xp))), (\text{bit\_rate}/(8*\text{picture\_rate}))\}$$

$$Tb=\max\{(R\text{gop}/(Nb+(Np*Kb*Xp)/(Kp*Xb))), (\text{bit\_rate}/(8*\text{picture\_rate}))\} \quad (3)$$

where Np and Nb are the numbers of remaining P and B pictures in the current GOP, and constants Kp=1.0 and Kb=1.4.

(STEP 2)

Three virtual buffers are used for the I-, P-, and B-pictures, respectively, to manage the differences of the target amounts of code obtained by equations (3) and the amounts of generated code. The data accumulation amount of each virtual buffer is fed back, and the Q-scale reference value is set, based on the data accumulation amount, for a macroblock to be encoded next so that the actual amount of generated code becomes closer to the target amount of code. For example, if the current picture type is P-picture, the difference between the target amount of code and the amount of generated code can be obtained by an arithmetic process based on $$dp,j=dp,0+Bp,j-1-((Tp*(j-1))/MB\_\text{cnt}) \quad (4)$$

where the suffix j is the macroblock number in the picture, dp,0 is the initial fullness of the virtual buffer, Bp,j is the total amount of code up to the jth macroblock, and MB_cnt is the number of macroblocks in the picture. The Q-scale reference value in the jth macroblock is obtained using dp,j (to be referred to as "dj" hereinafter) by $$Qj=(dj*31)/r \quad (5)$$

$$\text{for } r=2*\text{bits\_rate}/\text{picture\_rate} \quad (6)$$

(STEP 3)

A process of finally determining the quantization scale based on the spatial activity of the encoding target macroblock to obtain a satisfactory visual characteristic, that is, a high decoded image quality is executed.

$$ACTj=1+\min(v\text{blk}1, v\text{blk}2, \ldots, v\text{blk}8) \quad (7)$$

where vblk1 to vblk4 are spatial activities in 8×8 sub-blocks in a macroblock with a frame structure, and vblk5 to vblk8 are spatial activities of 8×8 sub-blocks in a macroblock with a field structure. The spatial activity can be calculated by $$v\text{blk}=\Sigma(Pi-P\text{bar})^2 \quad (8)$$

$$P\text{bar}=(1/64)*\Sigma Pi \quad (9)$$

where Pi is a pixel value in the ith macroblock, and Σ in equations (8) and (9) indicates calculations for i=1 to 64. ACTj obtained by equation (7) is normalized by $$N\_ACTj=(2*ACTj+AVG\_ACT)/(ACTj+AVG\_ACT) \quad (10)$$

where AVG_ACT is a reference value of ACTj in the previously encoded picture, and the quantization scale (Q-scale value) MQUANTj is finally calculated by $$MQUANTj=Qj*N\_ACTj \quad (11)$$

According to the above-described TM5 algorithm, the process in STEP 1 assigns a large amount of code to I-picture. A large amount of code is allocated to a flat region (with low spatial activity) where degradation is visually noticeable in the picture. This enables code amount control and quantization control within a predetermined bit rate while suppressing the degradation in image quality.

There is also proposed a method of controlling quantization in accordance with the characteristic of an image, like TM5, thereby improving the visual characteristic (Japanese Patent Laid-Open No. 11-196417).

The above-described TM5 method extracts a characteristic from each macroblock and performs adaptive quantization while changing the quantization parameter based on the characteristic so that quantization control is performed to achieve a predetermined target amount of code.

In Japanese Patent Laid-Open No. 11-196417, if the number of blocks which have high complexities and require raising the quantization parameter is small, the degradation of a block having a high complexity becomes conspicuous although the amount of generated code increases. Hence, adaptive quantization is inhibited. This also applies to a case in which the number of blocks which have low complexities and require to lower the quantization parameter is large.

SUMMARY OF THE INVENTION

In the above algorithm, however, the image quality varies because of the presence/absence of adaptive quantization among frames.

Even in an image including many blocks requiring lower quantization parameters, some blocks such as a flat region do not increase the amount of code because of the characteristics of the blocks. Hence, adaptive quantization cannot be performed for an image which should undergo the adaptive quantization.

The present invention will provide an encoding technique which allows suppressing degradation in image quality by executing adaptive quantization considering the degree of degradation of an encoded image and the characteristic of each block.

According to one aspect of embodiments of the present invention, the present invention relates to an encoding apparatus which divides an input image into a plurality of blocks and encodes the image, comprising a detection unit configured to determine a characteristic of the image of each of the plurality of blocks and to detect whether visual degradation in each block is noticeable, a determination unit configured to determine a quantization parameter of each block based on a detection result of the detection unit, a transformation unit configured to perform orthogonal transformation of the block and quantization using the determined quantization parameter, an encoding unit configured to perform variable-length encoding of a transformation result of the transformation unit, an inverse transformation unit configured to inversely transform the transformation result of the transformation unit to generate a locally decoded image, and a calculation unit configured to calculate a reference value to change a criterion to determine the characteristic of the image, wherein the detection unit detects a block having noticeable visual degradation by changing the criterion in accordance with the reference value.

According to another aspect of embodiments of the present invention, the present invention relates to a method of controlling an encoding apparatus which divides an input image into a plurality of blocks and encodes the image, comprising determining a characteristic of the image of each of the plurality of blocks and detecting whether visual degradation in each block is noticeable, determining a quantization parameter of each block based on a detection result in the detecting, performing orthogonal transformation of the block and quantization using the determined quantization parameter, performing variable-length encoding of a transformation result in the orthogonal transformation, inversely transforming the transformation result in the orthogonal transformation to generate a locally decoded image, and calculating a reference value to change a criterion to determine the characteristic of the image, wherein in the detecting, a block having noticeable visual degradation is detected by changing the criterion in accordance with the reference value.

According to further aspect of embodiments of the present invention, the present invention relates to an encoding apparatus comprising transformation/encoding unit configured to transform and encode each block of input image data which is divided into a plurality of blocks and to output transformation coefficient data, character detection unit configured to extract, from the plurality of blocks, a block having a characteristic whose visual degradation is noticeable, and to output the number of extracted blocks in a frame, quantization control unit configured to determine a quantization parameter of each block in accordance with the number of extracted blocks from the character detection unit, and quantization unit configured to quantize the transformation coefficient data output from the transformation/encoding unit for each block in accordance with the quantization parameter determined by the quantization control unit.

Further features of the present invention will become apparent from the following description of exemplary embodiments with reference to the attached drawings.

BRIEF DESCRIPTION OF THE DRAWINGS

FIG. 7 shows graphs for explaining a mechanism of flicker occurrence according to the second embodiment of the present invention;

DESCRIPTION OF THE EMBODIMENTS

The embodiments of the present invention will now be described with reference to the accompanying drawings.

Figure 1:
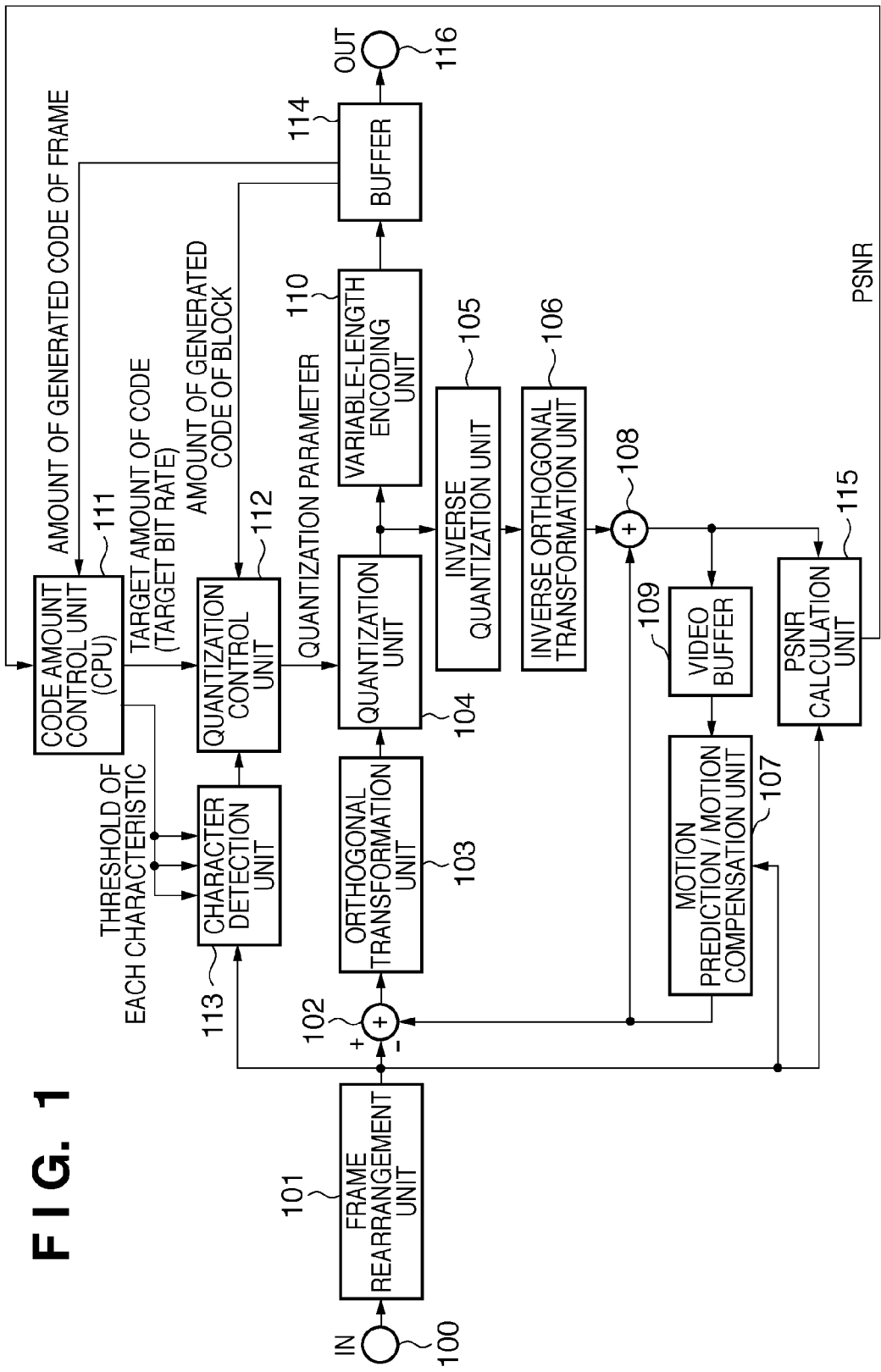
FIG. 1 is a block diagram showing an example of the arrangement of an encoding apparatus according to the first embodiment of the present invention.
Figure 4:
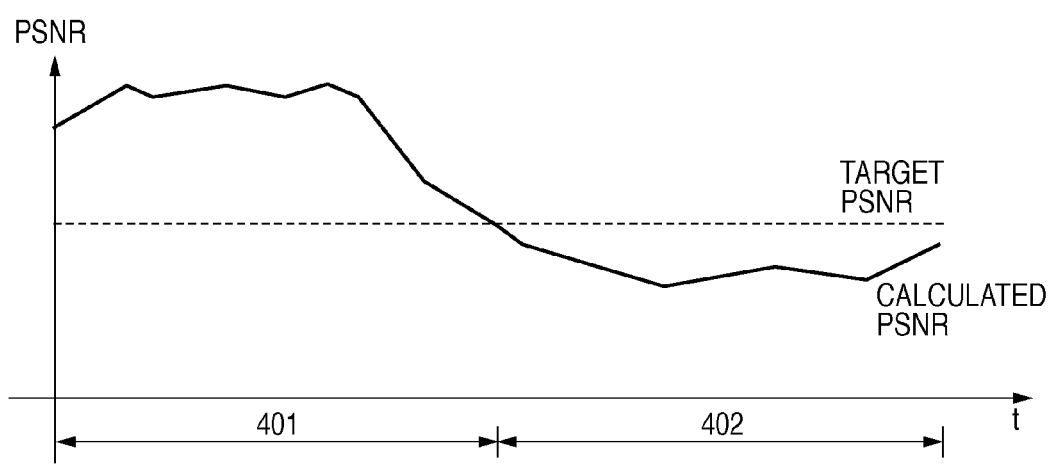
FIG. 4 is a graph for explaining PSNR according to the first embodiment of the present invention.
Figure 5A:
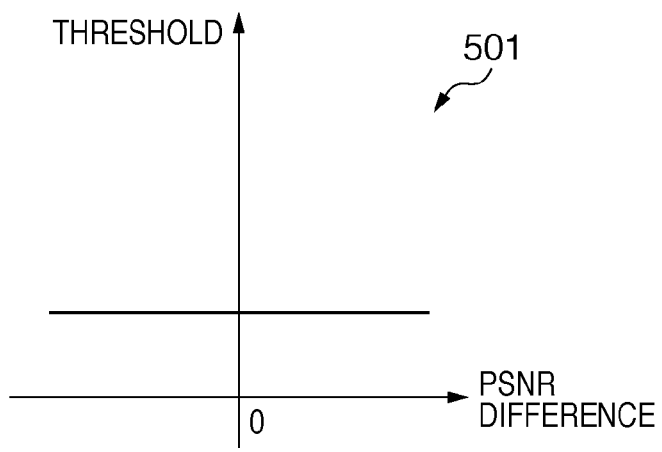
FIGS. 5A to 5C are graphs for explaining the relationships between PSNR and thresholds according to the first embodiment of the present invention.
Figure 5B:
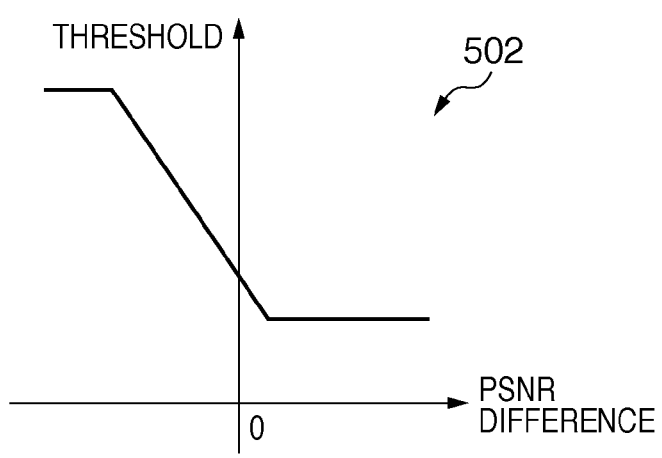
Figure 5C:
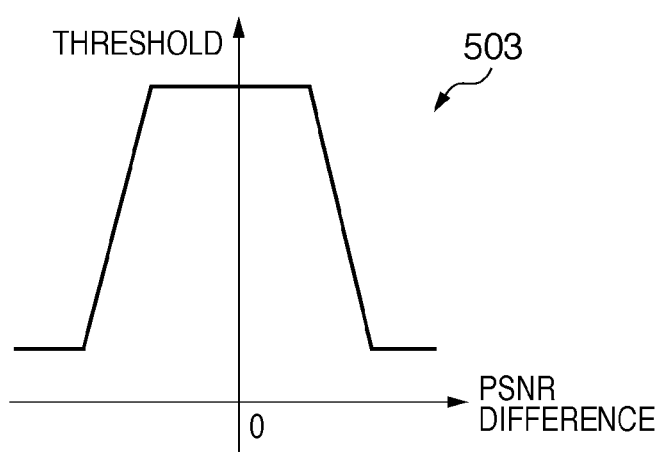

The first embodiment will be described with reference to FIGS. 1 to 3C. FIG. 1 is a block diagram showing an example of the overall arrangement of an encoding apparatus according to this embodiment. FIGS. 2, and 3A to 3C are views for explaining character detection according to this embodiment. FIG. 4 is a graph for explaining PSNR. FIGS. 5A to 5C are graphs showing the relationships between PSNR and thresholds.

FIG. 1 shows an encoding apparatus according to the embodiment of the present invention. This apparatus can be implemented as a video and audio signal recording apparatus such as a digital video camera. The apparatus supports an encoding method such as MPEG (Moving Pictures of Experts Group) or H.264/AVC (Advanced Video Coding).

Referring to FIG. 1, an input signal 100, which is generated by dividing moving images into predetermined blocks, is input to the encoding apparatus. In, e.g., MPEG, 16×16 or 8×8 blocks are used. The size is determined by the encoding method. The blocks will be referred to as "macroblocks" hereinafter.

The encoding apparatus includes a frame rearrangement unit 101, an addition/subtraction unit 102, an orthogonal transformation (DCT) unit 103, a quantization unit 104, an inverse quantization unit 105, an inverse orthogonal transformation (inverse DCT) unit 106, and a motion prediction/motion compensation unit 107. The encoding apparatus also includes an addition/subtraction unit 108, a video buffer 109 serving as a frame memory, a variable-length encoding unit 110, a code amount control unit 111, a quantization control unit 112, a character detection unit 113, and a buffer 114 which temporarily holds a stream from the encoding apparatus. The encoding apparatus also includes a PSNR calculation unit 115 which calculates PSNR (Peak Signal to Noise Ratio) based on an input image and a locally decoded image, and an output signal 116 from the encoding apparatus. PSNR is an index representing the degree of degradation of an image upon encoding and is expressed by a unit called dB (decibel). PSNR is calculated using the sum of squares of the difference between an input image and a locally decoded image. If the PSNR value as the calculation result is large, encoding degradation is small. If the PSNR value is small, encoding degradation is large. In this embodiment, PSNR is calculated for each macroblock, and the sum of PSNR values of all macroblocks included in an image is used as a calculated PSNR.

The operation of the encoding apparatus according to this embodiment will be described below. The input signal 100 undergoes rearrangement complying with the encoding picture type in the frame rearrangement unit 101. The image that has undergone rearrangement is divided into blocks. When the encoding picture is an intra-frame encoding (intra-encoding) method, the orthogonal transformation unit 103 executes orthogonal transformation of the signal in each macroblock. The quantization unit 104 quantizes DCT coefficients obtained as orthogonal transformation results.

When the encoding picture is an inter-frame encoding picture (inter-encoding) method, the inverse quantization unit 105 performs inverse quantization, and the inverse orthogonal transformation unit 106 performs inverse orthogonal transformation of the already encoded picture. With the inverse transformation, a locally decoded image is created. The motion prediction/motion compensation unit 107 performs motion prediction and motion compensation with respect to the picture to be encoded. The addition/subtraction unit 102 calculates the difference value to the locally decoded image. The orthogonal transformation unit 103 performs orthogonal transformation of the difference value. The quantization unit 104 quantizes the DCT coefficients.

Independently of whether the encoding is infra-frame encoding or inter-frame encoding, the quantized signal obtained by the quantization unit 104 is encoded by the variable-length encoding unit 110. The encoded signal is output as the output signal 116.

The code amount control unit 111 and the quantization control unit 112 will be described next. The code amount control unit 111 allocates the assigned bit amount to each picture in the GOP based on the bit amount for pictures in the GOP, including the assignment target picture. The allocation is repeated in the order of encoding pictures in the GOP to set the target amount of code of each picture. The code amount control unit 111 also provides a threshold of each characteristic to the character detection unit 113.

Next, the quantization control unit 112 determines the quantization parameter. To make the target amount of code of each picture match the actual amount of generated code, the amount of generated code of each macroblock, which is output from the code amount control unit 111, is obtained by feedback control as the quantization scale reference value based on the capacity of the virtual buffer. The quantization parameter to be used by the quantization unit 104 is determined using equation (11) based on the activity calculated by the character detection unit 113 with respect to the quantization scale reference value. The above-described operation corresponds to STEPS 1 to 3 described in the "background".

The process in the character detection unit 113 will be described below with reference to FIGS. 2, and 3A to 3C. The character detection unit 113 determines the characteristic of an image based on a threshold provided by the code amount control unit 111 and detects whether visual degradation in each macroblock is noticeable. In this embodiment, a flat block, edge block, and skin color block will be exemplified as blocks in which the visual degradation is noticeable. All the flat block, edge block, and skin color block will be explained below. However, the present invention can be practiced for one of them or a combination of them.

Figure 2:
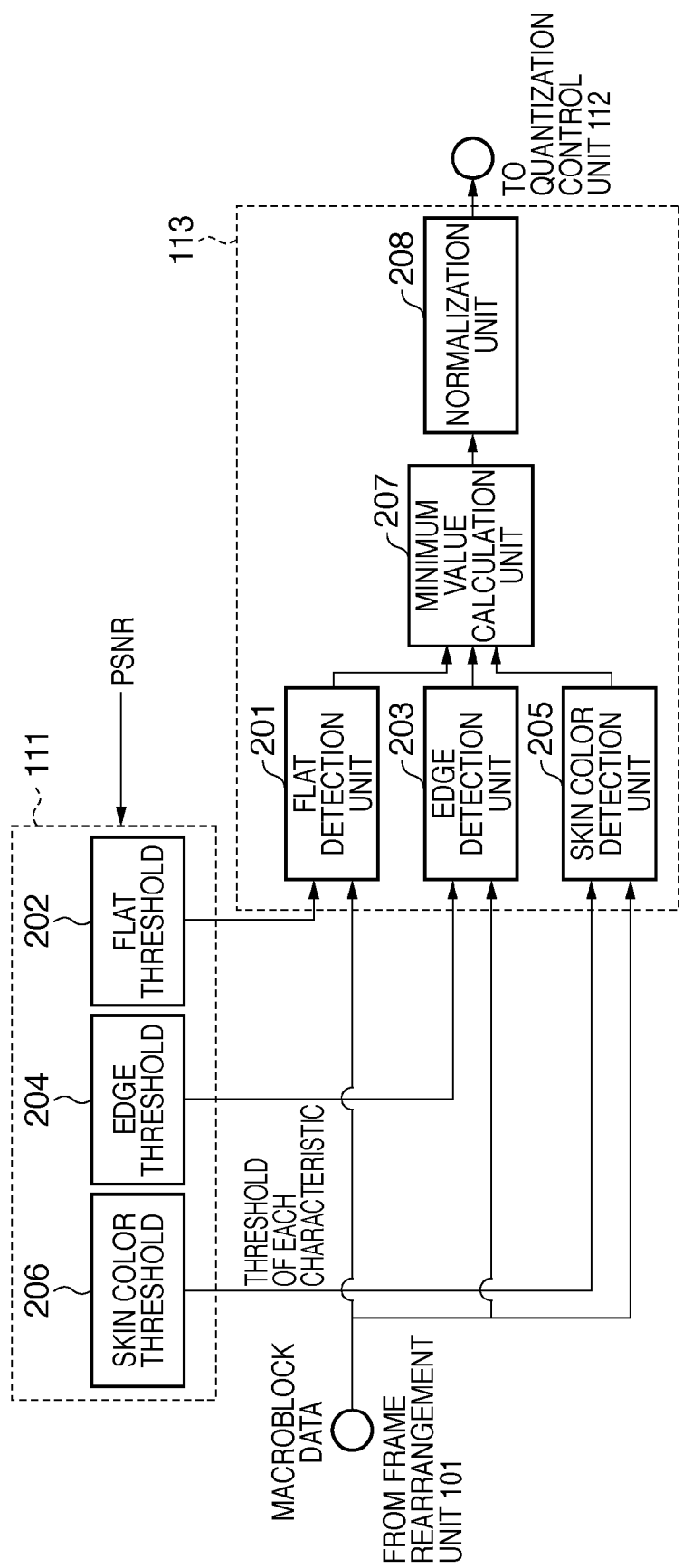
FIG. 2 is a block diagram for explaining the process of a character detection unit according to the first embodiment of the present invention.

As shown in FIG. 2, the character detection unit 113 includes a flat detection unit 201, edge detection unit 203, and skin color detection unit 205. The detection units receive a flat threshold 202 (th1F, th2F), edge threshold 204 (th1E, th2E), and skin color threshold 206 (th1S, th2S) from the code amount control unit 111, respectively. The thresholds serve as criteria to determine whether a macroblock belongs to a flat block, edge block, or skin color block. A minimum value calculation unit 207 calculates an activity before normalization in accordance with the level calculated by each detection unit. A normalization unit 208 calculates a normalized activity by applying a predetermined reaction parameter to the activity before normalization. Each parameter is variable.

Figure 3A:
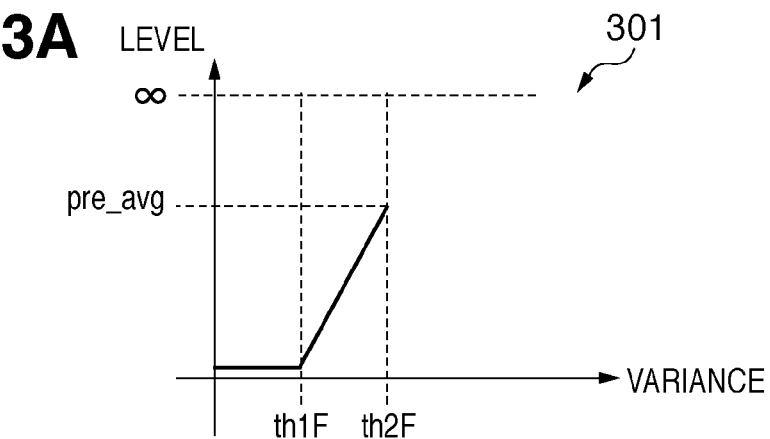
FIGS. 3A to 3C are graphs showing functions of converting the strengths of detection units to levels according to the first embodiment of the present invention.
Figure 3B:
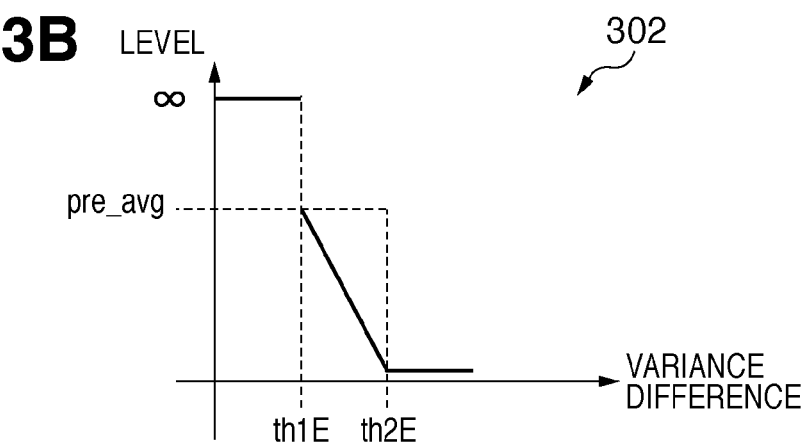
Figure 3C:
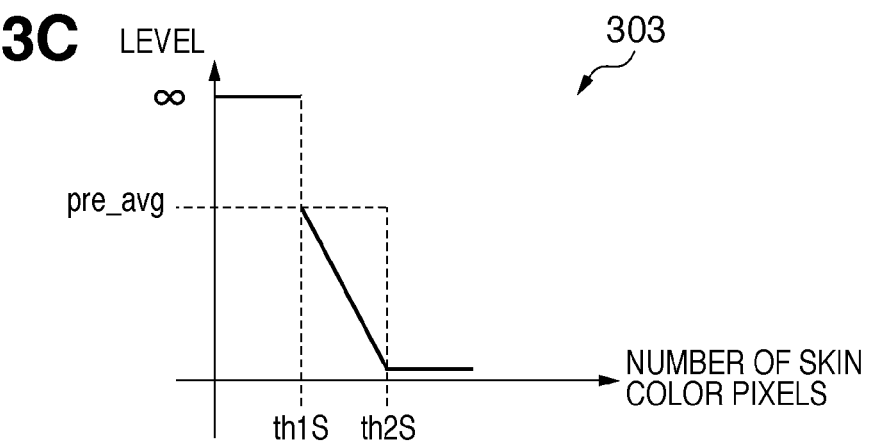

FIGS. 3A to 3C are graphs for explaining functions of converting the strengths of the detection units to levels. FIG. 3A shows a function 301 for the flat detection unit. FIG. 3B shows a function 302 for the edge detection unit. FIG. 3C shows a function 303 for the skin color detection unit.

The image signal of each block input to the character detection unit 113 is converted into a level in accordance with the threshold input to each detection unit. The process of each detection unit will be described below.

The flat detection unit 201 calculates the variance for the block signal and compares the variance with the thresholds. If the variance is equal to or smaller than th1F, the level is 1. If the variance is equal to or larger than th2F, the level is infinite. The variance represents the degree of variation of pixel values in a block. As the level becomes lower, the variance of the pixel values in the block becomes small. That is, the block tends to be a flat image. If the variance falls between the thresholds th1F and th2F, the level is calculated based on a function that connects (th1F,1) and (th2F,pre_avg). Note that "pre_avg" is the average value of activities in the immediately preceding encoded picture. The first thresholds th1F and th2F are included in the flat threshold 202 (first threshold) which is set for each frame by the code amount control unit 111 formed from a CPU.

The edge detection unit 203 further divides the block signal into 8×8 sub-blocks and calculates the variance for each sub-block. The edge detection unit calculates the difference between the maximum value and the minimum value of the variances and compares the difference with the thresholds. If the difference is equal to or larger than th2E, the level is 1. If the difference is equal to or smaller than th1E, the level is infinite. As the level becomes lower, the variance difference between the sub-blocks becomes large. That is, the block tends to be an edge image. If the difference falls between the thresholds th1E and th2E, the level is calculated based on a function that connects (th1E,pre_avg) and (th2E,1). Note that "pre_avg" is the average value of activities in the immediately preceding encoded picture. The thresholds th1E and th2E are included in the edge threshold 204 (second threshold) which is set for each frame by the code amount control unit 111 formed from a CPU.

The skin color detection unit 205 counts the number of skin color pixels based on the luminance component and the color difference components of the block signal. The skin color detection unit compares the number with the thresholds. If the number is equal to or larger than th2S, the level is 1. If the number is equal to or smaller than th1S, the level is infinite. As the level becomes lower, the number of skin color pixels becomes large. That is, the block tends to be a skin color image. If the number falls between the thresholds th1S and th2S, the level is calculated based on a function that connects (th1S,pre_avg) and (th2S,1). Note that "pre_avg" is the average value of activities in the immediately preceding encoded picture. The thresholds th1S and th2S are included in the skin color threshold 206 (third threshold) which is set for each frame by the code amount control unit 111 formed from a CPU.

Finally, the minimum value calculation unit 207 determines, as the activity before normalization, the minimum one of the levels calculated by the detection units 201, 203, and 205. The normalization unit 208 normalizes the activity. If all the levels from the detection units are infinite, the variance of the block is determined as the activity before normalization.

In this embodiment, it is possible to change each threshold serving as a criterion in the following way based on the PSNR calculated by the PSNR calculation unit 115. This process will be described with reference to FIGS. 4, and 5A to 5C.

FIG. 4 is a graph in which the abscissa represents the time, and the ordinate represents the PSNR. The dotted line indicates PSNR as a predetermined target (target PSNR). The solid line indicates PSNR calculated by the PSNR calculation unit 115 (calculated PSNR). If the calculated PSNR is higher than the target PSNR, the image quality can be determined to be high. If the calculated PSNR is lower than the target PSNR, the image quality can be determined to be poor.

The following interpretation of PSNR is also possible according to the aspect of the amount of code. When the calculated PSNR is higher than the target PSNR, a sufficient amount of code is assigned to the image to be encoded, and simultaneously, a stable state is ensured in terms of the amount of code. It is therefore possible to detect more edge and skin color blocks by character detection and assign a larger amount of code.

On the other hand, when the calculated PSNR is lower than the target PSNR, a sufficient amount of code is not assigned to the image to be encoded, and simultaneously, an unstable state is generated in terms of the amount of code. For this reason, if too many edge and skin color blocks are detected by character detection, a large amount of code is assigned to the edge and skin color blocks while no sufficient amount of code is assigned to a block containing a high frequency. Visual degradation in the block containing a high frequency is supposed to be unnoticeable even when relatively coarse quantization is performed. However, if the assigned amount of code is too small, the image quality largely degrades in the block containing a high frequency. Additionally, a buffer failure may occur.

In this embodiment, the threshold to be provided to each detection unit is controlled in accordance with the difference between the target PSNR and the calculated PSNR. FIGS. 5A to 5C are graphs in which the abscissa represents the difference (PSNR difference) obtained by subtracting the calculated PSNR from the target PSNR, and the ordinate represents the threshold of each detection unit.

FIG. 5A shows a graph 501 showing a change in the flat threshold 202 with respect to the PSNR difference. The abscissa represents the PSNR difference, and the ordinate represents the flat threshold corresponding to th1F and th2F in the function 301 shown in FIG. 3A. That is, the threshold th1F or th2F changes in correspondence with the graph 501 in accordance with the PSNR difference.

FIG. 5B shows a graph 502 showing a change in the edge threshold 204. The abscissa represents the PSNR difference, and the ordinate represents the edge threshold corresponding to th1E and th2E in the function 302 shown in FIG. 3B. That is, the threshold th1E or th2E changes in correspondence with the graph 502 in accordance with the PSNR difference.

FIG. 5C shows a graph 503 showing a change in the skin color threshold 206. The abscissa represents the PSNR difference, and the ordinate represents the skin color threshold corresponding to th1S and th2S in the function 303 shown in FIG. 3C. That is, the threshold th1S or th2S changes in correspondence with the graph 503 in accordance with the PSNR difference.

As in a region 401 in FIG. 4, if the calculated PSNR calculated by the PSNR calculation unit 115 is higher than the target PSNR, the image quality is stable and can be further improved. Hence, the thresholds are changed to detect more edge blocks and skin color blocks. The thresholds are preferably changed continuously in consideration of the degree of separation between the target PSNR and the calculated PSNR (degree of degradation), as shown in FIGS. 5A to 5C. For flat blocks, the threshold is not changed because the amount of code does not greatly increase even when the quantization parameter is changed.

As in a region 402 in FIG. 4, if the calculated PSNR is lower than the target PSNR, and the degree of degradation is high, the image quality is poor in general. Even when a large amount of code is assigned to edge blocks, improvement of the image quality cannot be expected. Hence, for the edge blocks, the threshold (Th1E and Th2E) is raised to detect only strong edges, i.e., particularly visually noticeable edges. A skin color block often includes an important region such as a human face. For this reason, even when the calculated PSNR is especially lower than the target PSNR, and the degree of degradation is higher than a predetermined degree, many skin color blocks are detected by lowering the threshold (Th1S and Th2S). In this case, the overall visual impression is improved by increasing the image quality of the skin color blocks, though degradation occurs in any portions except for the face.

The thresholds are preferably changed continuously in consideration of the degree of separation between the target PSNR and the calculated PSNR, as shown in FIGS. 5A to 5C. The method used by each detection unit is not limited to that described above. Instead of the variance, the element for detection may be obtained by, e.g., frequency conversion.

As described above, the encoding apparatus according to this embodiment makes it possible to improve the image quality of a block in which visual degradation is noticeable in the stable state of the amount of generated code by changing, in accordance with the degree of degradation of the encoded image, the number of blocks to be extracted. Even when the degree of degradation of the encoded image is high, a larger amount of code is assigned to blocks whose degradation should particularly be suppressed, thereby giving an impression that the image quality is high.

(Second Embodiment)

In the first embodiment, the character detection unit 113 determines whether visual degradation in each macroblock is noticeable by using PSNR representing the degree of degradation of an image. In the second embodiment, the threshold to be provided to each detection unit is controlled depending on whether a flicker is likely to occur in an image that is played back.

Figure 6:
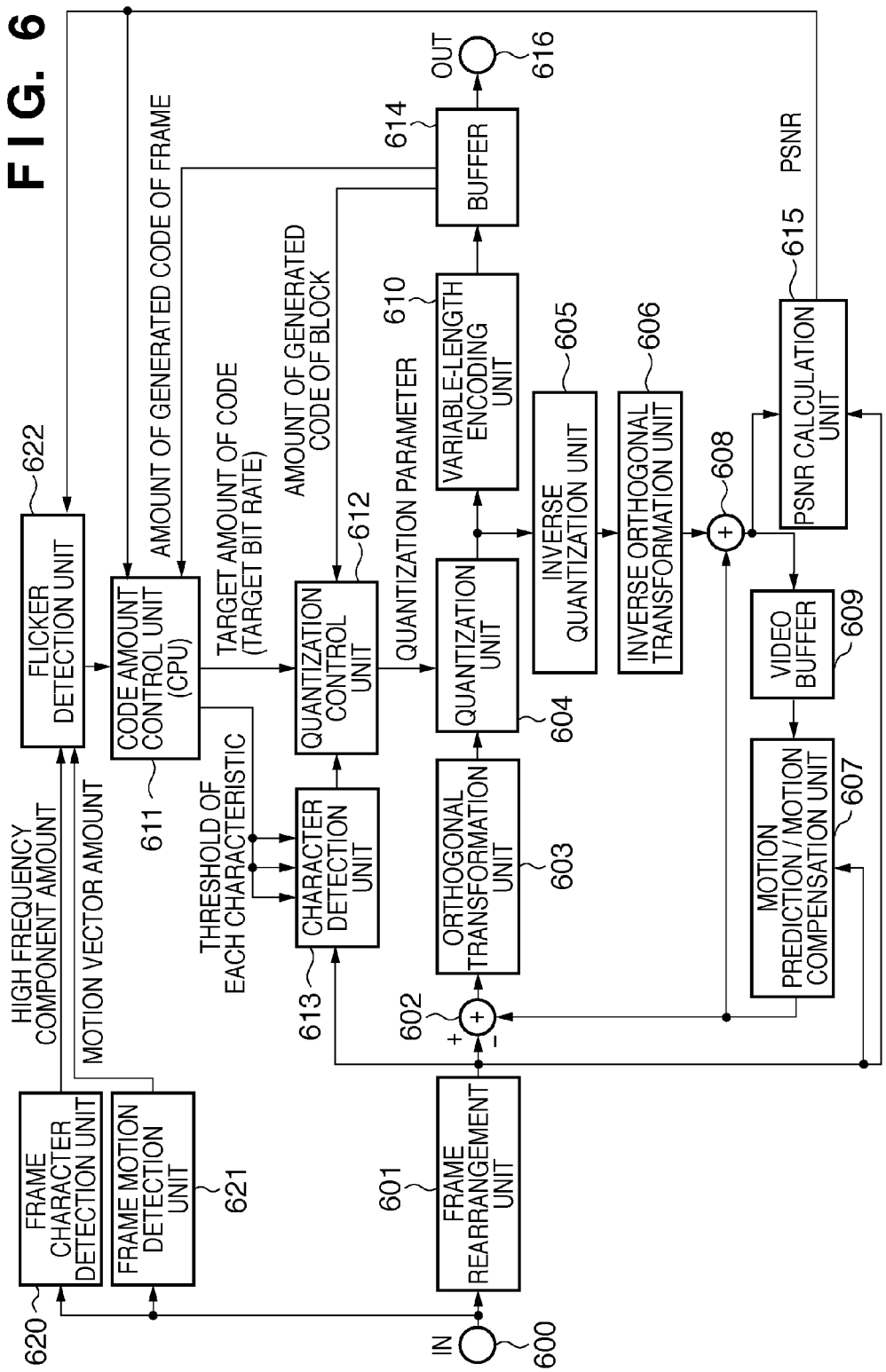
FIG. 6 is a block diagram showing an example of the arrangement of an encoding apparatus according to the second embodiment of the present invention.

FIG. 6 is a block diagram showing an example of the overall arrangement of an encoding apparatus according to the second embodiment. The basic arrangement is the same as in the first embodiment except that a mechanism for detecting a flicker is added to the arrangement in FIG. 1. The arrangement of a character detection unit 613 is the same as that of the character detection unit 113 in FIG. 1 and will therefore be described with reference to FIG. 2.

Referring to FIG. 6, the encoding apparatus includes a frame rearrangement unit 601, addition/subtraction unit 602, an orthogonal transformation (DCT) unit 603, a quantization unit 604, an inverse quantization unit 605, an inverse orthogonal transformation (inverse DCT) unit 606, and a motion prediction/motion compensation unit 607. The encoding apparatus also includes an addition/subtraction unit 608, a video buffer 609 serving as a frame memory, a variable-length encoding unit 610, a code amount control unit 611, a quantization control unit 612, the character detection unit 613, and a buffer 614 which temporarily holds a stream from the encoding apparatus. The encoding apparatus also includes a PSNR calculation unit 615 which calculates PSNR (Peak Signal to Noise Ratio) based on an input image and a locally decoded image, and an output signal 616 from the encoding apparatus. The above-described arrangement is the same as in FIG. 1. The encoding apparatus also includes a frame character detection unit 620, a frame motion detection unit 621, and a flicker detection unit 622. The character detection unit 613 extracts the characteristic of each macroblock. However, the frame character detection unit 620 extracts the characteristic of each frame so the expression is different. The functions of these units will be described.

The frame character detection unit 620 calculates, as a frame activity, the complexity of an image to be encoded based on image data from an input terminal 600. In the second embodiment, the AC component amount and, more preferably, the high frequency component amount of the image data is employed as the complexity. More specifically, image data of one frame is divided into blocks of a predetermined size, and the variance in each block is calculated. The sum of the variances calculated in all blocks is used as the high frequency component amount. A frequency component obtained by frequency conversion such as DCT (Discrete Cosine Transformation) or Hadamard transformation may be used in place of the variance.

The frame motion detection unit 621 correlates the image data of adjacent frames from the input terminal 600 and calculates the moving amount of the entire image to be encoded. More specifically, the image of one frame is divided into blocks of a predetermined size, and the coordinate shift amount at which the correlation is the highest is calculated in each block while shifting the coordinates of one of the adjacent frame images. The sum of motion vector amounts calculated in the respective blocks of the frame is defined as the inter-frame moving amount. The inter-frame moving amount represents a global movement (global vector) and can be calculated by any method other than that described above.

As in the first embodiment, the apparatus has the PSNR calculation unit 615 which calculates the encoding distortion amount based on the input image and the locally decoded image. The PSNR calculation unit 615 calculate the PSNR of each macroblock based on the image data from the input terminal 600 and locally decoded image data (image data output from the adder 608). Then, the PSNR calculation unit 615 outputs, as the final PSNR, the sum of the PSNR values of the macroblocks in one frame. The PSNR calculated here is PSNR for an encoded image, i.e., at least immediately preceding image of the image to be encoded.

The flicker detection unit 622 receives the frame activity from the frame character detection unit 620, the inter-frame moving amount from the frame motion detection unit 621, and the PSNR from the PSNR calculation unit 615. The flicker detection unit 622 detects in accordance with these three parameters whether a flicker is likely to occur in the image to be encoded.

The mechanism of flicker occurrence will be described below with reference to FIG. 7. FIG. 7 shows graphs for explaining the mechanism of flicker occurrence according to this embodiment. FIG. 7 shows a luminance signal after encoding using both intra-frame encoding and inter-frame encoding. A graph 701 in FIG. 7 shows a time-rate change in the playback signal level of I-picture. The abscissa represents the time (or frame), and the ordinate represents the playback video signal level. The dotted line of luminance average indicates the average value of video signals. This also applies to graphs 702 and 703. The dotted line of peak luminance indicates the peak value of the luminance of the video signals. This also applies to the graphs 702 and 703. The peak luminance of a noise component superimposed on a flat video signal can be reconstructed to some extent by intra-frame encoding. This is because the amount of code assigned to I-picture is larger than those of the remaining picture types in the above-described code amount control algorithm.

The graph 702 in FIG. 7 shows a time-rate change in the playback signal level of a picture such as P- or B-picture that is encoded by inter-frame encoding. The abscissa represents the time (or frame), and the ordinate represents the playback video signal level. The correlation between frames becomes low in an image having high complexity. For this reason, in normal encoding, the difference information amount between frames increases in P- and B-pictures. This degrades the video signal upon encoding so the peak luminance cannot be reconstructed. In the graph 702, the peak luminance varies as compared to the I-picture shown in the graph 701. Hence, as shown in the graph 703, a luminance flicker occurs at the time of moving image playback. The abscissa represents the time (or frame), and the ordinate represents the playback video signal level.

However, not all large peak luminance differences are perceived as a flicker. The human visual characteristic more readily detects degradation in an image with a small motion than degradation in an image with a large motion. This is the reason why flat blocks in a still image contain annoying noise. For this reason, no peak luminance difference can be detected in an image with a large motion, and a flicker is rarely perceived. If a peak luminance difference is generated not in an image with a large motion but in an image with a small motion, a flicker is noticeable.

The mechanism of flicker occurrence has been described above.

The conditions of flicker occurrence are that the luminance peak value after encoding changes between the picture types, and the image has a small motion, as described above. The luminance peak value is generated after encoding in an image that satisfies two conditions: 1) the complexity of the image is high, and 2) the encoded image is degraded. The first condition means that the high frequency component amount calculated by the frame character detection unit 620 is large. The second condition means that the PSNR calculated by the PSNR calculation unit 615 is low.

If one of the conditions is not satisfied, the luminance peak difference is not generated. For example, an image containing many high frequencies has a high complexity. That is, the image satisfies the first condition. However, if the bit rate is high, the encoded image does not degrade, and no luminance peak difference is generated. On the other hand, if the encoded image degrades, the second condition is satisfied. However, if the bit rate is low, the encoded image degrades even when the complexity of the image is low. In this case, no luminance peak difference is generated. The condition of an image with a small motion is that the moving amount of the entire image is small. This means that the inter-frame moving amount calculated by the frame motion detection unit 621 is small.

The flicker detection unit 622 can calculate the degree of flicker occurrence based on the high frequency component amount, inter-frame moving amount, and PSNR. If the high frequency component amount is larger than its reference value, the PSNR is smaller than its reference value, and the inter-frame moving amount is smaller than its reference value, a flicker occurs in the image to be encoded at a high probability. Hence, the degree of flicker occurrence is high. To the contrary, if the conditions are not satisfied, the degree of flicker occurrence is low. The degree of flicker occurrence can be calculated by any method. However, the degree of flicker occurrence is a discrete value. The larger the value is, the higher the degree of flicker occurrence is.

Figure 8A:
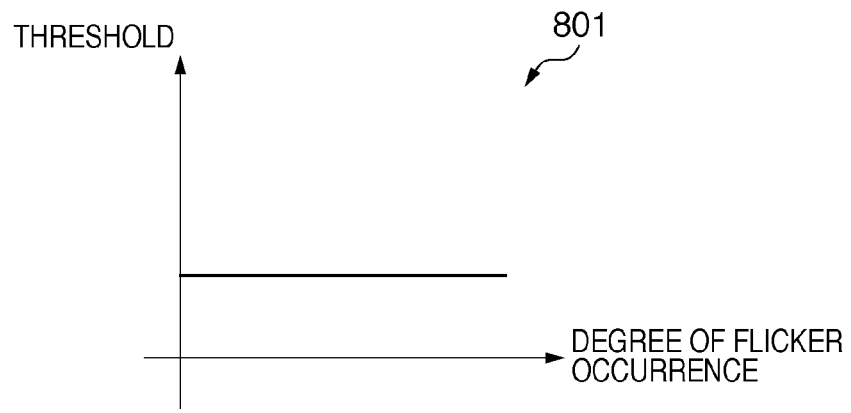
FIGS. 8A to 8C are graphs for explaining the relationships between the degree of flicker occurrence and thresholds according to the second embodiment of the present invention.
Figure 8B:
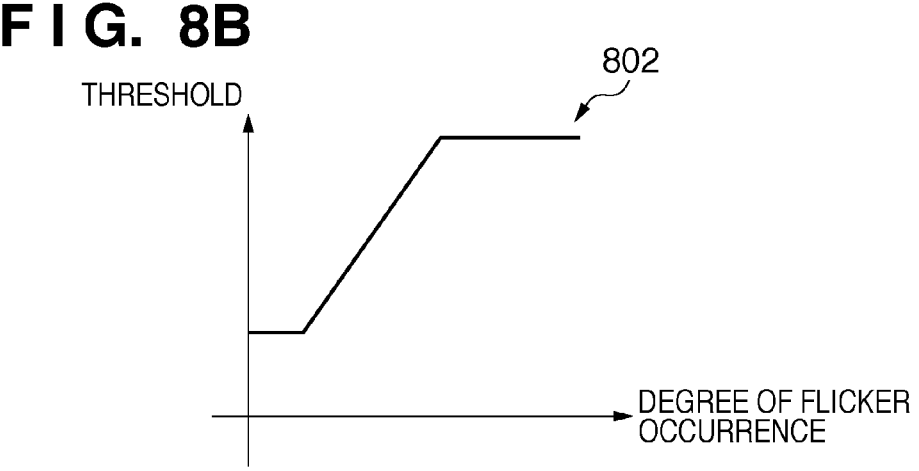
Figure 8C:
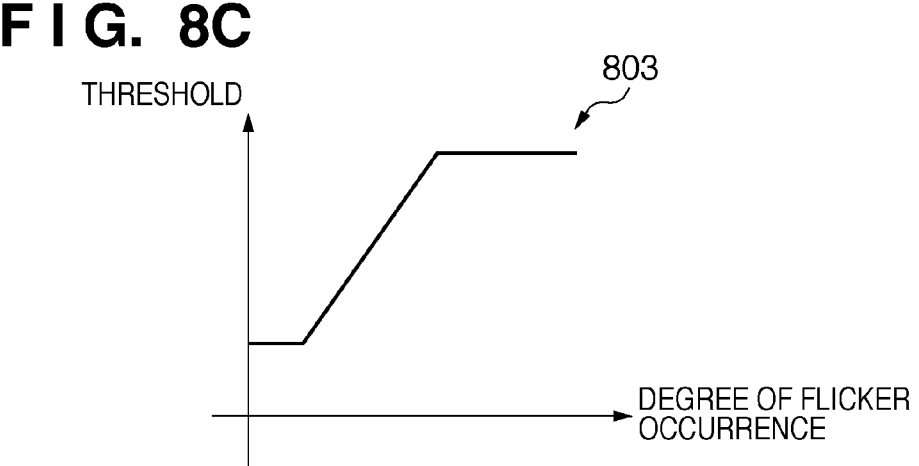

FIGS. 8A to 8C are graphs for explaining the relationships between the degree of flicker occurrence and thresholds according to this embodiment. Each of FIGS. 8A to 8C shows a graph in which the abscissa represents the degree of flicker occurrence, and the ordinate represents the threshold of the detection unit. FIG. 8A shows a graph 801 showing a change in a flat threshold 202 with respect to the degree of flicker occurrence. The abscissa represents the degree of flicker occurrence, and the ordinate represents the flat threshold corresponding to th1F and th2F in a function 301 shown in FIG. 3A. That is, the threshold th1F or th2F changes in correspondence with the graph 801 in accordance with the degree of flicker occurrence.

FIG. 8B shows a graph 802 showing a change in an edge threshold 204 with respect to the degree of flicker occurrence. The abscissa represents the degree of flicker occurrence, and the ordinate represents the edge threshold corresponding to th1E and th2E in a function 302 shown in FIG. 3B. That is, the threshold th1E or th2E changes in correspondence with the graph 802 in accordance with the degree of flicker occurrence.

FIG. 8C shows a graph 803 showing a change in a skin color threshold 206 with respect to ht degree of flicker occurrence. The abscissa represents the degree of flicker occurrence, and the ordinate represents the skin color threshold corresponding to th1S and th2S in a function 303 shown in FIG. 3C. That is, the threshold th1S or th2S changes in correspondence with the graph 803 in accordance with the degree of flicker occurrence.

If the degree of flicker occurrence is high based on the result of the flicker detection unit 622, and a too large amount of code is assigned to a region where degradation is noticeable, the amount of code for regions containing high frequency components becomes small, and a strong flicker occurs. To prevent this, for the edge blocks, the threshold (Th1E and Th2E) is raised to detect only strong edges, i.e., particularly visually noticeable edges. For the skin color blocks, the threshold (Th1S and Th2S) is raised to detect only strong skin colors, i.e., particularly visually noticeable skin colors.

If the degree of flicker occurrence is low based on the result of the flicker detection unit 622, the image contains only few high frequency components, and the PSNR is sufficiently high. It is therefore further assign an amount of code to the region where degradation is noticeable. Hence, for the edge blocks, many edges are detected by lowering the threshold (Th1E and Th2E). For the skin color blocks, many skin colors are detected by lowering the threshold (Th1S and Th2S).

For flat blocks, the flat threshold (Th1F and Th2F) is not changed depending on the degree of flicker occurrence because the amount of code does not greatly increase even when the quantization parameter is changed.

As described above, the encoding apparatus according to this embodiment makes it possible to improve the image quality of a block in which visual degradation is noticeable in the stable state of the amount of generated code by changing, in accordance with the degree of flicker occurrence of the encoded image, the number of blocks to be extracted. Even when the degree of flicker occurrence of the encoded image is high, a larger amount of code is assigned to blocks whose degradation should particularly be suppressed, thereby giving an impression that the image quality is high.

(Third Embodiment)

Figure 9:
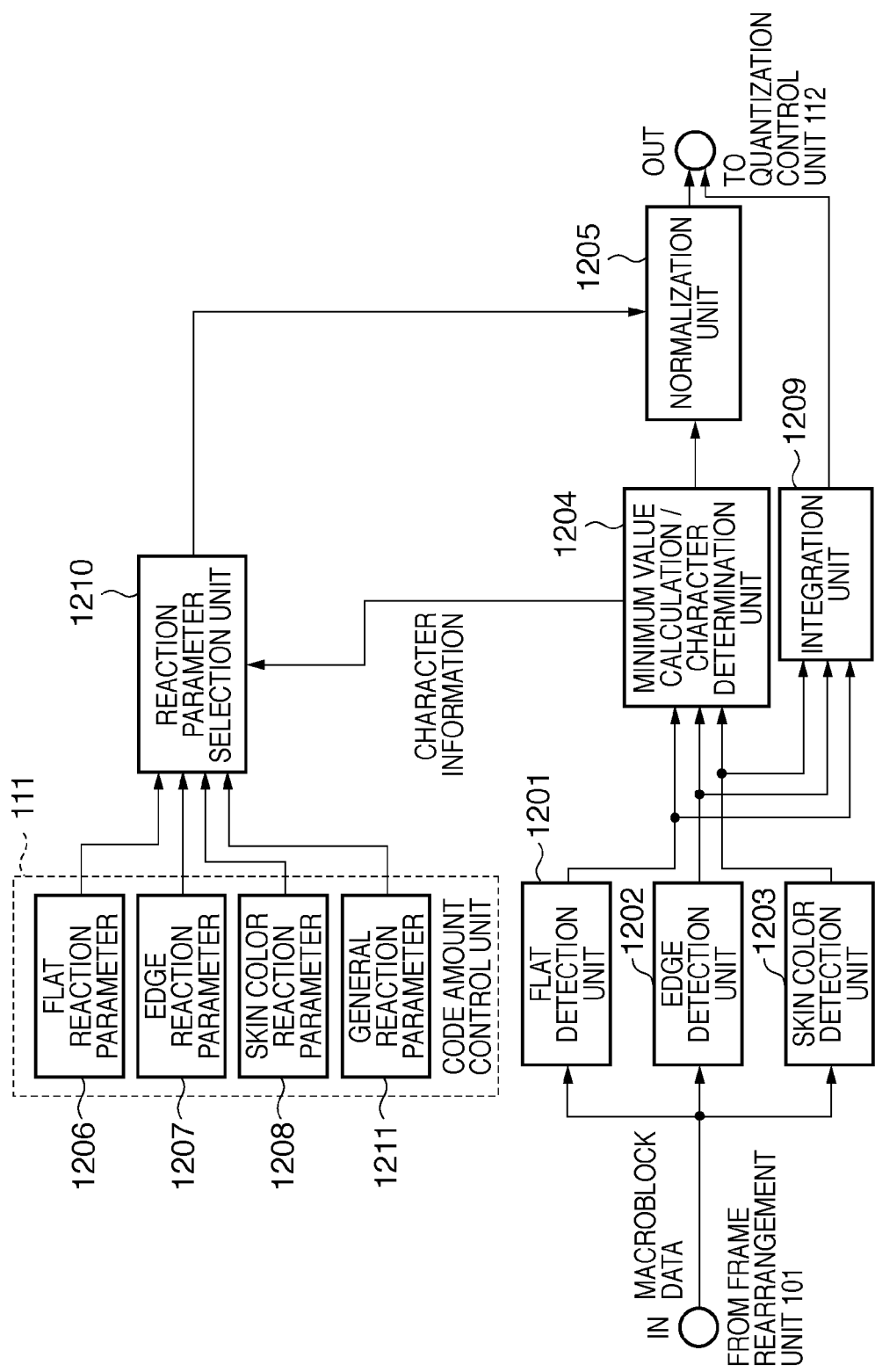
FIG. 9 is a block diagram showing the schematic arrangements of a code amount control unit 111 and a character detection unit 113 according to the third embodiment of the present invention.

The arrangement of an encoding apparatus according to this embodiment is the same as in FIG. 1. In this embodiment, however, the encoding apparatus need not include a PSNR calculation unit 115. FIG. 9 is a block diagram showing the schematic arrangement of a character detection unit 113. FIGS. 10A and 10B and FIGS. 11A to 11C are views for explaining the operation.

FIG. 9 is a block diagram showing the schematic arrangements of a code amount control unit 111 and the character detection unit 113 according to this embodiment. A flat detection unit 1201 detects the degree (level) of a flat block from the image data of each macroblock from a frame rearrangement unit 101. An edge detection unit 1202 detects the degree (level) of an edge from the image data from the frame rearrangement unit 101. A skin color detection unit 1203 detects the degree (level) of a skin color from the image data from the frame rearrangement unit 101. The detection characteristics of the detection units 1201, 1202, and 1203 or the functions of conversion to levels are the same as in FIGS. 3A to 3C.

A minimum value calculation/character determination unit 1204 calculates a minimum value of the levels calculated by the detection units 1201, 1202, and 1203 and outputs the value of the minimum level (activity before normalization) to a normalization unit 1205. If all the levels calculated by the detection units 1201, 1202, and 1203 are infinite, the minimum value calculation/character determination unit 1204 outputs the variance of the macroblock as the activity before normalization. The minimum value calculation/character determination unit 1204 also sends the information of the minimum value of the level in the macroblock or information representing that all the levels are infinite to a reaction parameter selection unit 1210 as the characteristic information of the macroblock.

The normalization unit 1205 calculates a normalized activity by applying a predetermined reaction parameter to the activity before normalization from the minimum value calculation/character determination unit 1204. The reaction parameter is a parameter that determines the value of the quantization parameter. A large reaction parameter makes the quantization parameter smaller.

The reaction parameter selection unit 1210 supplies the information of the reaction parameter to be used by the normalization unit 1205 for the normalization processing. A reaction parameter corresponding to the characteristic of the macroblock is used. The reaction parameter selection unit 1210 selects the reaction parameter to be used in accordance with the characteristic information received from the minimum value calculation/character determination unit 1204. In this embodiment, a flat reaction parameter 1206, edge reaction parameter 1207, and skin color reaction parameter 1208 are prepared in correspondence with a flat block (detection unit 1201), an edge block (detection unit 1202), and a skin color block (detection unit 1203), respectively, each of which is indicated by the minimum value represented by the characteristic information. A general reaction parameter 1211 is also prepared as a reaction parameter usable when the macroblock does not belong to any of the flat, edge, and skin color blocks. The reaction parameter selection unit 1210 selects one of the reaction parameters 1206, 1207, and 1208 in accordance with the minimum value represented by the acquired characteristic information. If the characteristic information represents that all levels are infinite, the reaction parameter selection unit 1210 selects the general reaction parameter 1211.

An integration unit 1209 counts the number of macroblocks detected by the detection units 1201, 1202, and 1203 for each type and supplies the numbers of extracted blocks to a quantization control unit 112. The relationship between each reaction parameter and the integration unit 1209 will be described with reference to FIGS. 10A to 11C.

Figure 10A:
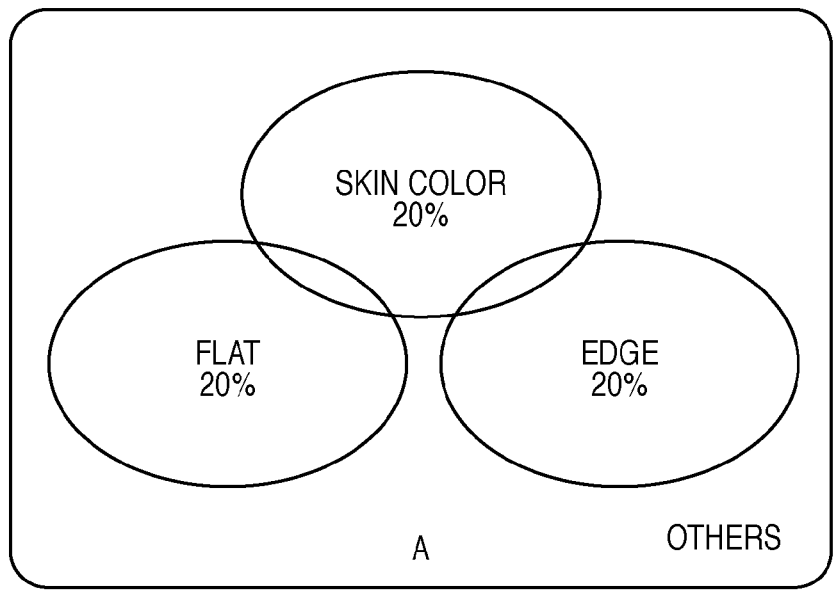
FIGS. 10A and 10B are views for explaining image examples with different characteristic ratios.
Figure 10B:
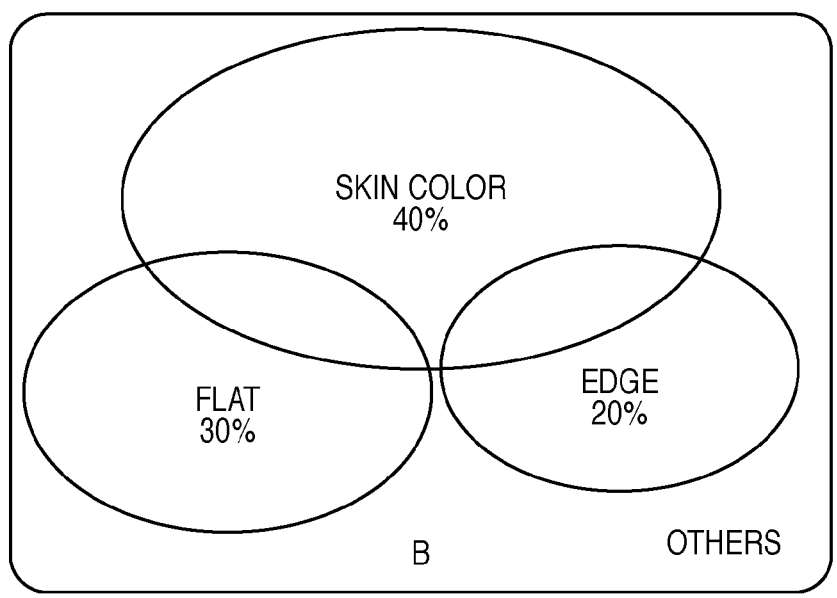

FIGS. 10A and 10B are views for explaining image examples with different characteristic ratios. FIG. 10A shows an image containing 20% flat blocks, 20% edge blocks, and 20% skin color blocks in a frame upon character detection. FIG. 10B shows an image containing 30% flat blocks, 20% edge blocks, and 40% skin color blocks. Macroblocks which belong to none of the types are classified into "others". A block that is flat and has a skin color, like a human cheek, belongs to a flat block. A block that is an edge and has a skin color, like a face outline, belongs to an edge block.

Figure 11A:
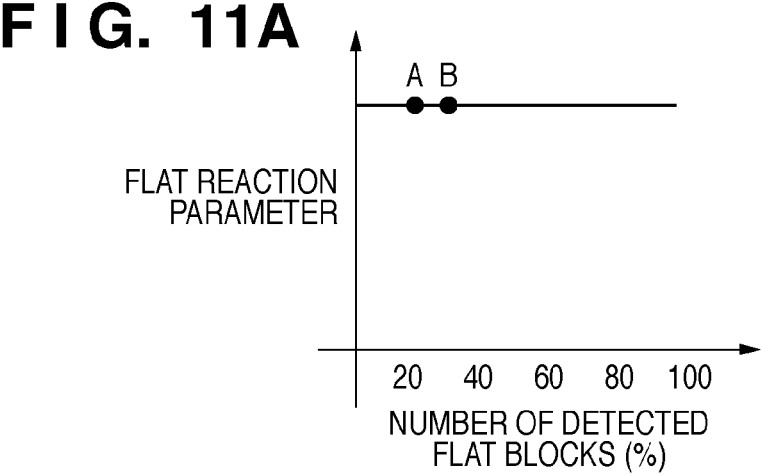
FIGS. 11A to 11C are graphs showing the relationships between the numbers of macroblocks detected in a frame and the reaction parameters.
Figure 11B:
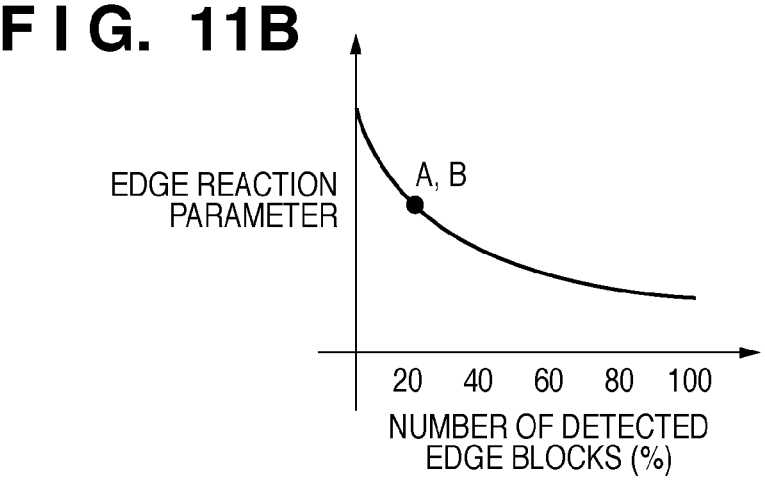
Figure 11C:
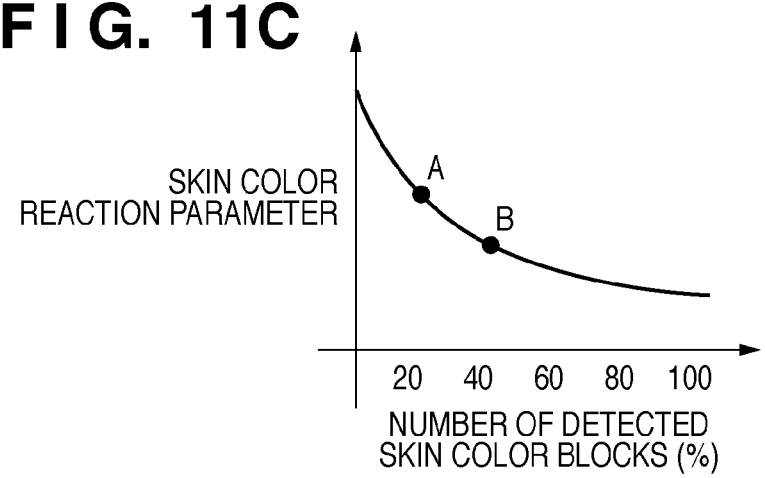

FIGS. 11A to 11C are graphs showing the relationships between the numbers of macroblocks detected in a frame and the reaction parameters. FFIG. 11A shows the flat reaction parameter. The abscissa represents the number of detected flat blocks, and the ordinate represents the reaction parameter. FIG. 11B shows the edge reaction parameter. FIG. 11C shows the skin color reaction parameter.

In the flat block, the image quality varies upon changing the quantization parameter, though the amount of code does not largely vary. That is, when the same quantization parameter is applied to the image example shown in FIG. 10A and that shown in FIG. 10B, the amount of code of the entire flat block does not largely change. For this reason, in this embodiment, the reaction parameter for the flat block is not largely changed in accordance with the number of detected macroblocks, as shown in FIG. 11A.

On the other hand, in the edge block and skin color block, the image quality varies, and the amount of code also largely varies upon changing the quantization parameter. It is possible to reduce mosquito noise by lowering the quantization parameter of the edge block. However, the amount of generated code increases accordingly. Similarly, it is possible to reduce degradation in the face by lowering the quantization parameter of the skin color block. However, the amount of generated code increases accordingly. If too many edge and skin color blocks are detected, a large amount of code is assigned to the edge and skin color blocks while the amount of code assigned to a block containing a high frequency decreases. Visual degradation in the block containing a high frequency is supposed to be unnoticeable even when relatively coarse quantization is performed. However, if the assigned amount of code is too small, the image quality largely degrades in the block containing a high frequency. Additionally, since the amount of code of the entire image also increases, the rate becomes higher than a predetermined rate.

In this embodiment, the reaction parameters for the edge block and skin color block are changed in accordance with the numbers of detected macroblocks. As shown in FIGS. 11B and 11C, if the number of macroblocks detected as edge blocks or skin color blocks is small, the reaction parameter is increased, thereby lowering the quantization parameter. If the number of macroblocks detected as edge blocks or skin color blocks is large, the reaction parameter is decreased, thereby preventing the quantization parameter from becoming too low. FIGS. 11B and 11C show curves having the same tendency. However, the curves can arbitrarily be set.

The number of detected edge blocks of the image example shown in FIG. 10A is the same as that in FIG. 10B. Hence, the quantization parameter is determined using a relatively large reaction parameter. However, the number of detected skin color blocks is larger in the image example shown in FIG. 10B than in FIG. 10A. Hence, in the image example shown in FFIG. 10A, the quantization parameter is determined using a relatively large reaction parameter. In the image example shown in FIG. 10B, the quantization parameter is determined using a relatively small reaction parameter.

The detection method of each detection unit is not limited to that described above. Instead of the variance, the element for detection may be obtained by, e.g., frequency conversion. In this embodiment, the types of blocks to be detected are the flat block, edge block, and skin color block. However, a block of any other type may be used as a constituent element. If the type causes not so large variation in the amount of code even upon changing the quantization parameter, like the flat block, the same control as that for the flat block is employed. If the type causes a large variation in the amount of code upon changing the quantization parameter, the same control as that for the edge block or skin color block is employed.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-280940 filed on Oct. 29, 2007, 2008-040983 filed on Feb. 22, 2008, and 2008-266831 filed on Oct. 15, 2008, which are hereby incorporated by reference herein in their entirety.

What is claimed is:

1. An encoding apparatus which divides an input image into a plurality of blocks and encodes the image, comprising:
   a detection unit configured to determine a characteristic of the image of each of the plurality of blocks and to detect a block in which visual degradation is noticeable, wherein the block to be detected includes at least one of a flat block, an edge block and a skin color block;
   a determination unit configured to determine a quantization parameter of each block based on a detection result of the detection unit;
   a transformation unit configured to perform orthogonal transformation of each block and quantization using the determined quantization parameter;
   an encoding unit configured to perform variable-length encoding of a transformation result of the transformation unit;
   an inverse transformation unit configured to inversely transform the transformation result of the transformation unit to generate a locally decoded image; and
   a calculation unit configured to calculate a reference value and change a criterion to determine the characteristic of the image according to the reference value,
   wherein the detection unit detects the block in which the visual degradation is noticeable, in accordance with the criterion changed by the calculation unit.

2. The apparatus according to claim 1, wherein the calculation unit calculates, as the reference value, a degree of degradation of the image based on Peak Signal to Noise Ratio (PSNR) between the input image and the locally decoded image generated by the inverse transformation unit.

3. The apparatus according to claim 1, wherein the calculation unit calculates, as the reference value, a degree of flicker occurrence in the input image which is encoded by variable-length encoding by the encoding unit.

4. The apparatus according to claim 3, wherein the calculation unit calculates the degree of flicker occurrence based on a high frequency component amount in the input image encoded by variable-length encoding, a moving amount between input images, and Peak Signal to Noise Ratio (PSNR) between the input image and the locally decoded image.

5. The apparatus according to claim 1, wherein if the block having noticeable visual degradation is included in a flat region in the input image,
   the detection unit calculates a variance of pixels in the block, determines based on a magnitude of the variance whether the block is included in the flat region, and detects the block having noticeable visual degradation.

6. The apparatus according to claim 5, wherein the detection unit determines whether the block is included in the flat region by using a first threshold as the criterion and comparing the first threshold with the variance.

7. The apparatus according to claim 1, wherein if the block having noticeable visual degradation is at least a part of an edge in the input image,
   the detection unit further divides the block into sub-blocks, calculates a difference of a variance of pixels between the sub-blocks, determines based on a magnitude of the difference whether the block is included in the edge, and detects the block having noticeable visual degradation.

8. The apparatus according to claim 7, wherein
   the detection unit determines whether the block is at least the part of the edge by using a second threshold as the criterion and comparing the second threshold with the difference, and
   if a degree represented by the reference value is higher than a predetermined degree, a value of the second threshold is increased.

9. The apparatus according to claim 1, wherein if the block having noticeable visual degradation is included in a skin color region in the input image,
   the detection unit calculates the number of skin color pixels in the block, determines based on a magnitude of the number whether the block is at least a part of the skin color region, and detects the block having noticeable visual degradation.

10. The apparatus according to claim 9, wherein,
   the detection unit determines whether the block is included in the skin color region by using a third threshold as the criterion and comparing the third threshold with the number, and
   if the reference value represents a degree of degradation of the image, and the degree of degradation is higher than a predetermined degree, a value of the third threshold is decreased, and if the reference value represents a degree of flicker occurrence in the input image encoded by variable-length encoding, and the degree of flicker occurrence is higher than a predetermined degree, a value of the third threshold is increased.

11. A method of controlling an encoding apparatus which divides an input image into a plurality of blocks and encodes the image, comprising:
- determining a characteristic of the image of each of the plurality of blocks and detecting a block in which visual degradation is noticeable, wherein the block to be detected includes at least one of a flat block, an edge block and a skin color block;
- determining a quantization parameter of each block based on a detection result in the detecting;
- performing orthogonal transformation of each block and quantization using the determined quantization parameter;
- performing variable-length encoding of a transformation result in the orthogonal transformation;
- inversely transforming the transformation result in the orthogonal transformation to generate a locally decoded image; and
- calculating a reference value and change a criterion to determine the characteristic of the image according to the reference value,
- wherein in the detecting, the block in which the visual degradation is noticeable, in accordance with the criterion changed by the calculation unit.

12. An encoding apparatus comprising:
- a transformation/encoding unit configured to transform and encode each block of input image data which is divided into a plurality of blocks and to output transformation coefficient data;
- a character detection unit configured to extract, from the plurality of blocks, a block having a characteristic whose visual degradation is noticeable, and to output the number of extracted blocks in a frame, wherein the block to be extracted has the characteristic including at least any one of a flat block, an edge block and a skin color block;
- a quantization control unit configured to determine a quantization parameter of each block in accordance with the number of extracted blocks from the character detection unit;
- a quantization unit configured to quantize the transformation coefficient data output from the transformation/encoding unit for each block in accordance with the quantization parameter determined by the quantization control unit;
- an inverse transformation unit configured to inversely transform the quantized transformation coefficient data output from the quantization unit to generate a locally decoded image; and
- a calculation unit configured to calculate a reference value and change a criterion to determine the block having a characteristic whose visual degradation is noticeable,
- wherein the character detection unit detects the block in which the visual degradation is noticeable, in accordance with the criterion changed by the calculation unit.

13. The apparatus according to claim 12, wherein the quantization control unit makes the quantization parameter for a block extracted by the character detection unit smaller than the quantization parameter for a block not extracted by the character detection unit.

14. The apparatus according to claim 12, wherein if the number of extracted blocks is smaller than a predetermined threshold, the quantization control unit makes the quantization parameter for a block extracted by the character detection unit smaller than the quantization parameter for a block not extracted by the character detection unit.

15. The apparatus according to claim 12, wherein the character detection unit extracts a block included in a flat region as the block having noticeable visual degradation.

16. The apparatus according to claim 15, wherein the quantization control unit determines the quantization parameter in accordance with the number of blocks, included in the flat region, extracted by the character detection unit.

17. The apparatus according to claim 12, wherein the character detection unit extracts a block being at least a part of an edge as the block having noticeable visual degradation.

18. The apparatus according to claim 17, wherein the quantization control unit determines the quantization parameter in accordance with the number of blocks, being at least the part of the edge, extracted by the character detection unit.

19. The apparatus according to claim 12, wherein the character detection unit extracts a block included in a skin color region as the block having noticeable visual degradation.

20. The apparatus according to claim 19, wherein the quantization control unit determines the quantization parameter in accordance with the number of blocks, included in the skin color region, extracted by the character detection unit.

21. A non-transitory computer readable storage medium storing a computer program, which causes a computer to function as an encoding apparatus which divides an input image into a plurality of blocks and encodes the image, comprising:
- a detection unit configured to determine a characteristic of the image of each of the plurality of blocks and detect a block in which visual degradation is noticeable, wherein the block to be detected includes at least one of a flat block, an edge block and a skin color block;
- a determination unit configured to determine a quantization parameter of each block based on a detection result of the detection unit;
- a transformation unit configured to perform orthogonal transformation of each block and quantization using the determined quantization parameter;
- an encoding unit configured to perform variable-length encoding of a transformation result of the transformation unit;
- an inverse transformation unit configured to inversely transform the transformation result of the transformation unit to generate a locally decoded image; and
- a calculation unit configured to calculate a reference value and change a criterion to determine the characteristic of the image according to the reference value,
- wherein the detection unit detects the block in which the visual degradation is noticeable, in accordance with the criterion changed by the calculation unit.

* * * * *